United States Patent [19]

Andrews

[11] Patent Number: 4,532,542
[45] Date of Patent: Jul. 30, 1985

[54] COMB FILTERS

[75] Inventor: Gary D. Andrews, Portland, Oreg.

[73] Assignee: Tektronix, Inc., Beaverton, Oreg.

[21] Appl. No.: 481,187

[22] Filed: Apr. 1, 1983

[51] Int. Cl.³ .............................................. H04N 9/535
[52] U.S. Cl. ..................................................... 358/31
[58] Field of Search ............................ 358/31; 333/166

[56] References Cited

U.S. PATENT DOCUMENTS 4,466,016  8/1984  Pritchard ............................... 358/31

*Primary Examiner*—John C. Martin
*Assistant Examiner*—Michael Dunnam
*Attorney, Agent, or Firm*—John Smith-Hill

[57] ABSTRACT

A filter circuit for processing a composite video signal comprises a series circuit of a delay device for delaying an input composite video signal for the duration of one line of the video signal and a first bandpass filter connected to the delay device to receive the delayed video signal. A transversal bandpass filter receives the input composite video signal and provides as outputs a delayed composite video signal and a delayed chrominance component. A first summing device sums the delayed chrominance component and the output of the series circuit, while a second summing device sums the delayed composite video signal and the output of the first summing device. The series circuit can be selectively disabled so as not to apply the delayed video signal to the first summing device.

2 Claims, 6 Drawing Figures

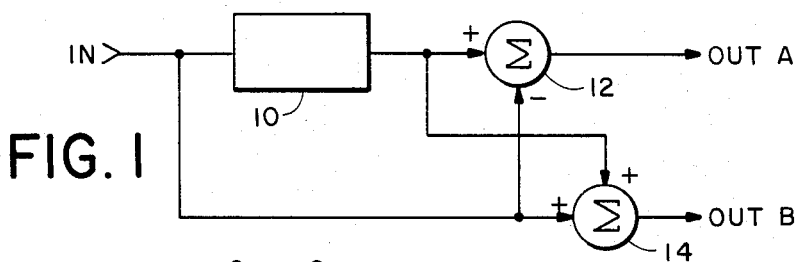
FIG. 1
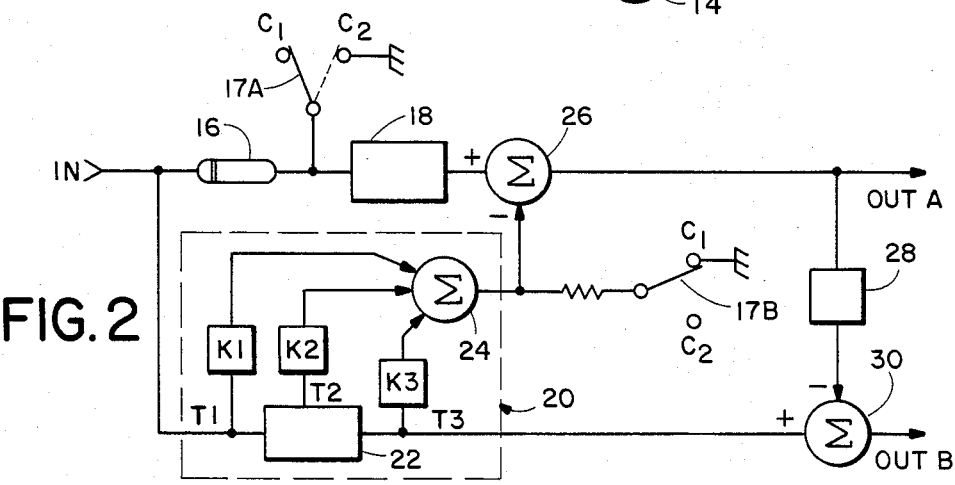
FIG. 2
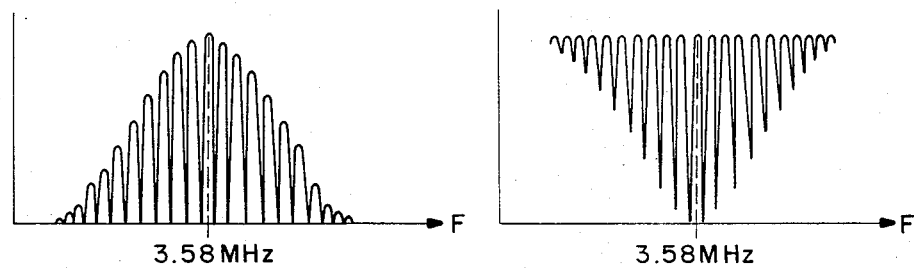
FIG. 3
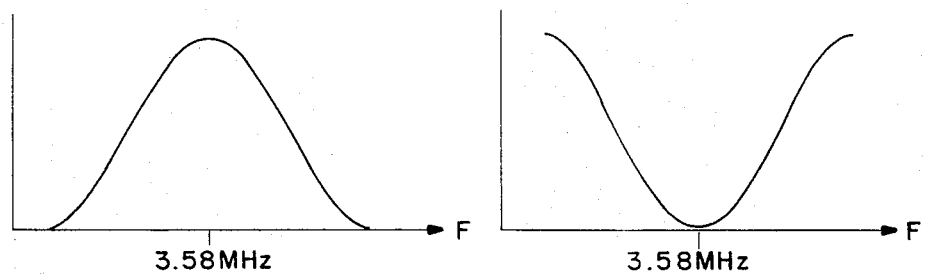

4,532,542

COMB FILTERS

This invention relates to comb filters, more especially to comb filters for separating the chrominance and luminance components of an encoded television (TV) signal.

BACKGROUND OF THE INVENTION

In the NTSC color TV system, the composite video signal consists of luminance and chrominance components and harmonics which are frequency-interleaved in order to minimize interference therebetween, e.g. beat, crosstalk, etc. Thus, the subcarrier encoded by the chrominance component is put on a region of the frequency spectrum which is free from signal energy of the luminance component. A comb filter may be used to separate the luminance and chrominance components from the composite video signal. The comb filter has a filter characteristic shaped like a comb, with the spacing between the teeth equal to the horizontal scanning frequency of the TV signal. The comb filter improves horizontal resolution in the region about 3.58 MHz and cross color in comparison with conventional bandpass and bandreject filters.

A conventional comb filter is shown in FIG. 1, and comprises a delay line 10, and two summing devices 12 and 14. The delay line 10 delays the input video signal for one line duration, about 63.56 $\mu$s. The comb filtered chrominance component is derived from an output terminal A by subtracting the input video signal from the delayed video signal and the comb filtered luminance component is derived from an output terminal B by summing the input and the delayed video signals. A detailed description of the operation of the conventional comb filter is not provided, because it is well known. In the illustrated conventional comb filter, the comb filtered luminance component and the comb filtered chrominance component have distinct signal paths even though the output of the delay line 10 is used to generate both components.

SUMMARY OF THE INVENTION

According to the present invention there is provided a filter circuit for processing a composite video signal including a chrominance component and a luminance component, said filter circuit comprising a series circuit of delay means for delaying an input composite video signal for the duration of one line of the video signal and a first bandpass filter connected to the delay means to receive the delayed video signal, and the filter circuit also comprising a transversal bandpass filter for receiving the input composite video signal and providing as outputs a delayed composite video signal and a delayed chrominance signal, first summing means for summing the delayed chrominance component and the output of the series circuit, second summing means for summing the delayed composite video signal and the output of said first summing means, and means which are operable selectively for disabling said series circuit so as not to apply a delayed video signal to the first summing means.

BRIEF DESCRIPTION OF THE DRAWINGS

For a better understanding of the invention, and to show how the same may be carried into effect, reference will now be made, by way of example, to the accompanying drawings in which:

FIG. 1 is a block diagram of a conventional comb filter,

FIG. 2 is a block diagram of a comb filter embodying the present invention,

FIGS. 3(a)-3(d) show the characteristics of the filter of FIG. 2 under different operating conditions.

DETAILED DESCRIPTION

Figure 4:
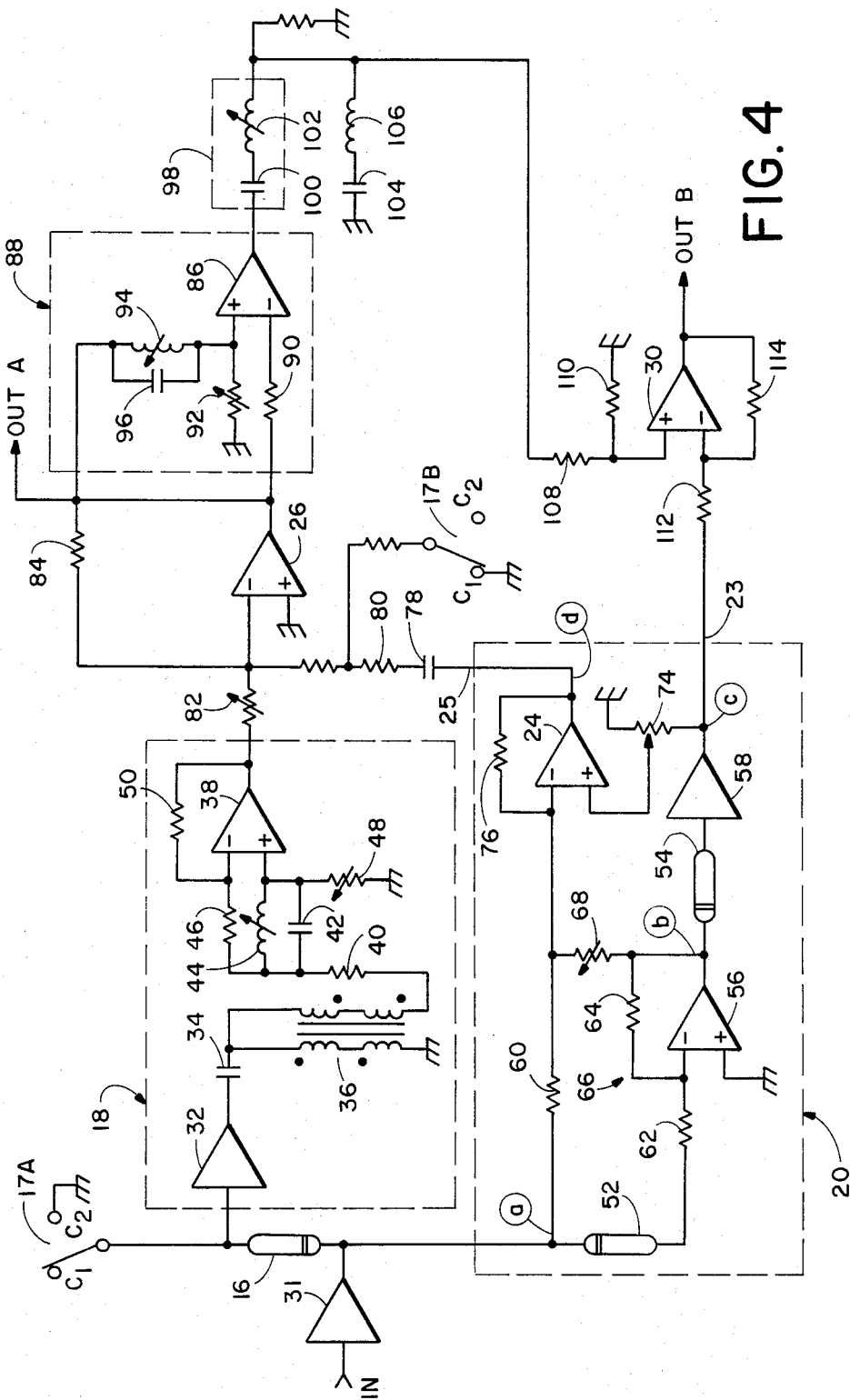
FIG. 4 is a schematic diagram of the FIG. 2 comb filter.

The NTSC composite video signal is applied to a delay line 16 of the FIG. 2 comb filter for providing a delay time equal to one line duration. The output of the delay line 16 is connected to a bandpass filter 18. The junction of the delay line 16 and the filter 18 is connected to the movable contact of a double pole, single throw switch 17A. The switch 17A is set to state $C_1$ or $C_2$ to pass the video signal or not. When the switch 17A is in the state $C_1$, the filter 18 passes the signal components in the vicinity of subcarrier frequency of about 3.58 MHz. That is, the filter 18 passes the harmonics of the luminance signal and the chrominance components interleaved therebetween. The output signal of the filter 18 thus contains the high frequency components of chrominance and luminance.

A second band-pass filter 20, which may be a transversal band-pass filter, also receives the input video signal. The filter 20 includes a delay line 22 with taps T1, T2 and T3 respectively having weighting coefficients K1, K2 and K3, and a summing device 24 for summing the delayed and weighted signals. The transversal filter is a well known device in which predetermined weighting coefficients are assigned to each tap to provide a filter having predetermined impulse response characteristics. In the general case, a transversal filter has n taps T1 through Tn and weighting coefficients K1 through Kn associated respectively therewith. By appropriately selecting the weighting coefficients K1, K2 and K3 the transversal filter 20 is formed with a linear phase characteristic and frequency response centered at the subcarrier frequency, about 3.58 MHz as mentioned above. Luminance and chrominance components adjacent to the subcarrier frequency pass through the filter 20.

The transversal filter 20 has two outputs 23 and 25. The signal provided at the output 23 is simply a delayed version of the input composite video signal. The signal at the output 25 contains the high frequency components of both chrominance and luminance.

The ouput of the band-pass filter 18 and the output 25 of the filter 20 are respectively connected to non-inverting and inverting inputs of a summing circuit 26. The output 25 of the filter 20 is additionally connected through a resistor to the movable contact of a second double pole, single throw switch 17B, which is ganged to the switch 17A. When the switch 17B is in the position $C_1$, the signal passing to the summing circuit 26 from the filter 20 is only half the magnitude of the signal that passes when the switch is in the position $C_2$. The output of the summing circuit 26 is connected both to the output terminal A and to a network 28. The outputs of the network 28 and the delay line 22 are respectively connected to inverting and non-inverting inputs of a third summing device 30. The output of the device 30 is connected to the output terminal B.

The switches 17A and 17B establish two operating modes for the FIG. 2 filter circuit. When the switches are in the state $C_1$, the circuit acts as a comb filter, providing combed chrominance at the output terminal A and combed luminance at the output terminal B. When the switches are in the state $C_2$, the circuit acts as a bandpass/bandreject filter, providing high frequency chrominance and luminance, centered about 3.58 MHz, at the terminal A and notch filtered luminance at the terminal B. In order to avoid the need to adjust the subsequent processing equipment connected to the terminals A and B whenever the switches 17A and 17B are changed from state $C_1$ to state $C_2$ or vice versa, it is necessary that the relative amplitudes of the signals at the terminals A and B be the same in both state $C_1$ and state $C_2$. In the state $C_1$, it is necessary that the relative amplitudes of the signals at the inputs of the summing device 26 be equal, say ½, in order to provide, at the terminal A, a combed chrominance component having a relative amplitude of 1. The relative amplitude at the inputs of the summing device 30 must also be equal, and this implies that the composite video signal at the output of the delay line 22 must have a relative amplitude of 1 and that the combed luminance at the terminal B has a relative amplitude of 1. In the state $C_2$, the output of the delay line 18 has a relative amplitude of zero, and in order to obtain a signal having a relative amplitude of 1 at the terminal A this implies that the signal at the output of the summing device 24 should have a relative amplitude of 1. Thus, the switch 17B is provided in order to ensure that the relative amplitude of the signal at the output of the summing device 24 in the state $C_2$ is half of what it is in the state $C_1$.

The operation when the switches 17A and 17B are in the state $C_2$ (bandpass/bandreject) is as follows. The filter 18 does not provide an output signal, and therefore the summing device 26 receives only the output signal of the filter 20 at its inverting input. The output signal of the summing device 26 is high frequency chrominance and luminance, and is routed through the network 28, which delays the signal and, if necessary, removes spurious responses of the filter 20, e.g. and output at three times subcarrier frequency. By providing an appropriate amount of delay in the network 28 the output signal from the device 26 is subtracted from the output of the delay line 22, and a null will occur at the subcarrier frequency. This bandreject notch filter provides excellent phase linearity because the high frequency chrominance and luminance signal is subtracted from the composite signal. The output signals provided at A and B may be represented as shown in FIGS. 3A and 3B.

The operation when the switches 17A and 17B are in the state C1 (comb filter) is as follows. The output amplitude of the filter 18 is matched with that of the filter 20 by an adjustment circuit in the filter 18 (not shown). The phase response of the delay line 16 and filter 18 is such that the output thereof goes through 360°, relative to the output of the filter 20, every 15.734 kHz. If the outputs of the filter 18 and 20 are in phase with each other and of equal amplitude, the chrominance signals are cancelled out in the summing device 26, and therefore the output signal at the output terminal A is zero. After a 7.867 kHz change in frequency has occurred, the output of the filter 18 will be 180° out of phase with the output of the filter 20. When these two outputs are subtracted at the summing device 26, the chrominance output at the terminal A will be twice the input amplitude, that is, due to the 180° phase shift, the signals actually add. As the frequency is increased an additional 7.867 kHz, the two signals applied to the summing device 26 will again be in phase and the chrominance output will be zero. By continuing in this manner, the comb characteristic shown in FIG. 3C is generated. The dotted line in the center tooth represents the subcarrier frequency of 3.58 MHz, and the centers of the teeth are spaced 15.734 kHz. Once the combed chrominance signal is available, it is routed through network 28. The combed chrominance signal is subtracted in the summing device 30 from the composite video at the output of the delay line 22 to produce the combed luminance. The comb filter characteristic for the luminance signal is illustrated in FIG. 3D. The teeth of the combed chrominance correspond to the valleys of the combed luminance. Thus, because of the subtraction the comb filter provides excellent separation of chrominance and luminance information.

FIG. 4 is a simplified circuit diagram of an embodiment of the comb filter according to the present invention, wherein similar reference characters refer to like elements. The composite video signal is applied to the delay line 16 via a buffer amplifier 31. The delay line 16 and its terminating impedances provide the major portion of the bandpass filter characteristics that are required. The filter 18 provides gain and control of phase and group delay, and includes an amplifier 32, a capacitor 34, a one to two auto transformer 36, and a variable phase and group delay adjustment circuit comprising an operational amplifier 38 and associated components. The capacitor 34 and transformer 36 provide additional bandpass 34 and transformer 36 provide additional bandpass filtering. The amplifier 32 provides a low source impedance for the transformer 36. The transformer 36 is connected to the inverting input of the operational amplifier 38 via a resistor 40 and a resistor 46. The junction of the resistors 40 and 46 is connected through a parallel combination of a capacitor 42 and variable inductor 44 to the non-inverting input of the operational amplifier 38, which is grounded via a variable resistor 48. The output of the operational amplifier 38 is fed back to the inverting input via a resistor 50. The output of the filter 18 should be appropriately adjusted regarding phase and delay for summing it with the output of the transversal filter 20. The variable inductor 44 provides enough phase adjustment for proper output phase, and the variable resistor 48 provides enough group delay adjustment to match the output of the filter 20.

The transversal bandpass filter 20 includes two delay lines 52 and 54 each of 140 ns delay time, operational amplifiers 24 and 56, a buffer amplifier 58 and resistors. The duration of a half cycle at the subcarrier frequency is approximately 140 ns, so that the chrominance signals at the outputs of the delay lines 52 and 54 are 180° out of phase with the chrominance signals at their inputs. Thus, the chrominance signal is effectively inverted by each of the delay lines. The composite video signal at the output of the buffer amplifier 31 is applied to the inverting input of the operational amplifier 24 acting as summing amplifier via the resistor 60. The output of buffer amp 31 is also applied to the inverting input of the amplifier 56 through the delay line 52 and a resistor 62. The operational amplifier 56 together with the input resistor 62 and a feedback resistor 64 form an inverting amplifier 66 for the output of the delay line 52. The resistance of the resistor 64 is twice that of the resistor 62, and consequently the gain of the amplifier 66 has a magnitude of two. This compensates for the 6 dB loss that is suffered by the signal in the delay line 52. The output of the inverting amplifier 66 is connected to the inverting input of the summing amplifier 24 via a variable resistor 68. When the slider of the variable resistor 68 is at the center of its range of movement, the resistors 68 and 60 have equal resistance. The output of the inverting amplifier 66 is applied to the amplifier 58 through the delay line 54. Thus, the chrominance component of the video signal applied to the amplifier 58 is inverted with respect to the video signal at the output of the amplifier 56. The output of the amplifier 58 is applied to a potentiometer 74, and the slider of the potentiometer is connected to the non-inverting input of the summing amplifier 24. A resistor 76 is connected across the inverting input and the output of the summing amplifier 24. The delay lines 52 and 54 connected in series correspond to the tapped delay line 22 (FIG. 2). The weighting coefficients depend on the resistance values of the resistors 60, 68, 74 and 76 and on the inverting amplifier 66. It can be shown that the magnitudes are:

$K1 = R76/R60$
$K2 = R76/R68$
$K3 = k(R60 + 2R76)/R60$ where k is proportional to the position of the slider of the potentiometer 74. The resistance values of the resistors 60 and 68 and the value of k are selected so that K1, K2 and K3 are of equal magnitude. It will be recognized that connection of the tap T1 (point a) to the inverting input of the amplifier 24 implies that K1 is negative, that the inverting action of the amplifier 66 implies that K2 is positive and that connection of the tap T3 (point c) to the non-inverting input of the amplifier 24 implies that K3 is negative.

The T pulse signal shown in FIG. 5a is a convenient signal for analyzing the phase linear characteristic of the bandpass filter 20. The waveforms at the points a through d in FIG. 4 are respectively illustrated in FIG. 5a through 5d. The T pulse is delayed and inverted by the delay line 52 and the inverting amplifier 66 (refer to FIG. 5b). The output of the inverting amplifier 66 is then added to the T pulse at the junction of the resistors 60 and 68. The output of the inverting amplifier 66 is also delayed by the delay line 54 (refer to FIG. 5c) and then coupled through a buffer amplifier 58 to the non-inverting input of the summing amplifier 24. The waveform of the output signal of the summing amplifier 24 is symmetrical as shown in FIG. 5d. This symmetrical waveform manifests the phase linear nature of the filter 20.

Figure 5:
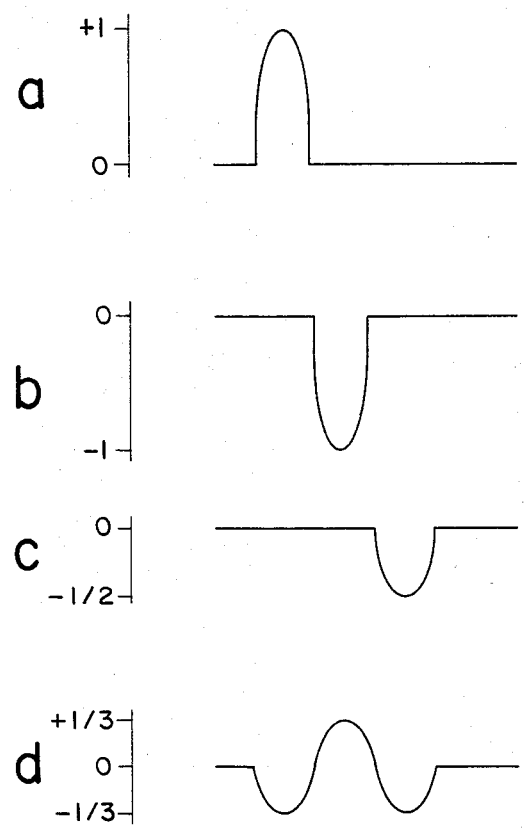
FIG. 5 shows waveforms for explaining the operation of FIG. 4.

The circuitry including the two delay lines 52 and 54, the amplifiers 56, 58 and 24, and their associated components comprise a transversal bandpass filter. The relative weights of the three taps are $-\frac{1}{3}$, $\frac{1}{3}$ and $-\frac{1}{3}$ as shown in FIG. 5. Assuming that the relative amplitude of the chrominance component is 1 at the input of the filter 20, the amplitude of the chrominance component at the output of the inverting amplifier 66 is also 1 because there is a 6 dB loss in the delay line 52 and the gain of the amplifier 66 is $-2$.

Figure 6:
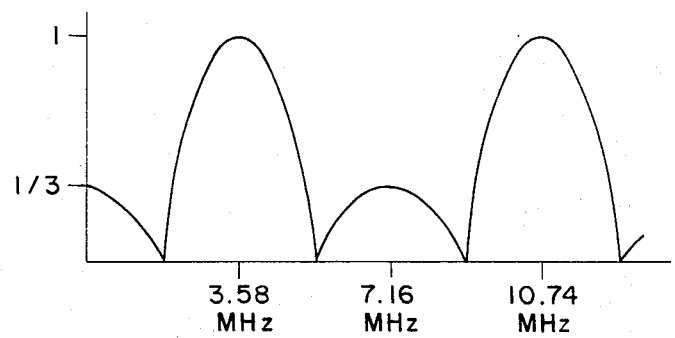
FIG. 6 shows a frequency characteristic for the output of the transversal filter of FIG. 4.

The frequency response at the output of the amplifier 24 is as shown in FIG. 6. The signal at the output of the buffer amplifier 58 is identical to the signal at the output of the amplifier 31, except for the delay of 280 ns. introduced by the delay lines 52 and 54.

The output of the filter 20 is applied to the summing amplifier which has a feedback resistor 84, through a capacitor 78 and a resistor 80. Also, the output of the bandpass filter 18 adjusted in phase and delay is applied to the summing amplifier 26 through a variable resistor 82 when the switch 17A is in the state C1. The variable resistor 82 is adjusted so that the relative amplitude of the output signal from the bandpass filter 18 is $\frac{1}{2}$. The output signal from the filter 20 has a relative amplitude of $\frac{1}{2}$, due to the action of the switch 17B. The phase of the chrominance signal component at the output of the filter 20 is the same as that at the output of the filter 18. However, the luminance signal component from the bandpass filter 18 is 180° out of phase with the luminance component from the bandpass filter 20. Thus, the luminance components of the two signals cancel and the chrominance components add, resulting in combed chrominance. When the switches 17A and 17B are in the state $C_2$, the output of the summing amplifier 26 is a bandpass filtered chrominance signal since the filter 18 does not provide an output.

The output of the amplifier 26 is connected to an equalizer 88 comprising an operational amplifier 86 and associated components for providing phase and group delay compensation for the luminance signal. The equalizer 88 includes a resistor 90 connected to the inverting input of the operational amplifier 86, a variable resistor 92 connected between the non-inverting input of the amplifier 86 and ground, a variable inductor 94 connected between the non-inverting input of the amplifier 86 and the output of the amplifier 26, and a capacitor 96 connected in parallel with the inductor 94. The variable resistor 92 and variable inductor 94 are adjusted so that the chrominance signal has the correct phase and group delay when it reaches the summing amplifier 30. The output of the equalizer 88 is connected to a bandpass filter 98, comprising a capacitor 100 and a variable inductor 102 connected in series. The filter 98 filters the chrominance signal to attenuate the components not in the vicinity of the 3.58 MHz component. The output of the filter 98 is connected to ground through an LC combination of a capacitor 104 and an inductor 106 which reduces the amplitude of the 10.7 MHz (3 fsc) component.

The summing amplifier 30 together with the associated resistors 108 through 114 subtracts the composite video signal at the output of the buffer amplifier 58 from the chrominance signal which is obtained from the equalizer 88 and is in phase with the chrominance portion of the signal from the amplifier 58. Thus, the chrominance components cancel, and the luminance component is derived from output terminal B. When the switch 17 is in the state $C_1$ this is combed luminance; and when the switch 17 is in the state $C_2$ this is notch-filtered luminance.

The combed luminance component is derived by subtracting the combed chrominance component from the composite video signal, thereby matching the teeth of the combed chrominance and the valleys of the combed luminance.

It will be appreciated that the invention is not restricted to the particular comb filter circuit which has been described with reference to FIGS. 2 and 4, since variation may be made therein without departing from the scope of the invention as defined in the appended claims, and equivalents thereof.

I claim:

1. A filter circuit for processing a composite video signal including a chrominance component and a luminance component, said filter circuit comprising a series circuit of delay means for delaying an input composite video signal for the duration of one line of the video signal and a first bandpass filter connected to the delay means to receive the delayed video signal, and the filter circuit also comprising a transversal bandpass filter for receiving the input composite video signal and providing as outputs a delayed composite video signal and a delayed chrominance component, first summing means for summing the delayed chrominance component and the output of the series circuit, second summing means for summing the delayed composite video signal and the output of said first summing means, and means which are operable selectively for disabling said series circuit so as not to apply a delayed video signal to the first summing means.

2. A filter circuit according to claim 1, comprising a network connected between the first and second summing means for delaying the chrominance component and removing spurious components from the output of the transversal bandpass filter.

* * * * *